C. L. BEST.
TRACTOR CHAIN.
APPLICATION FILED FEB. 15, 1917.
1,356,958. Patented Oct. 26, 1920.
3 SHEETS—SHEET 2.
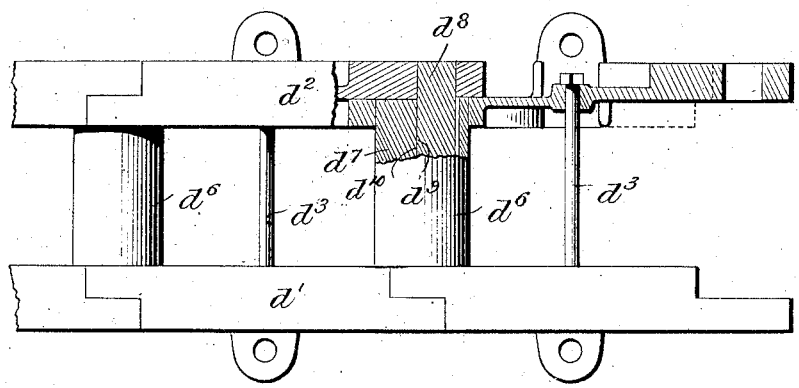
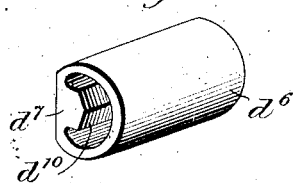
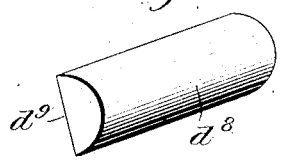
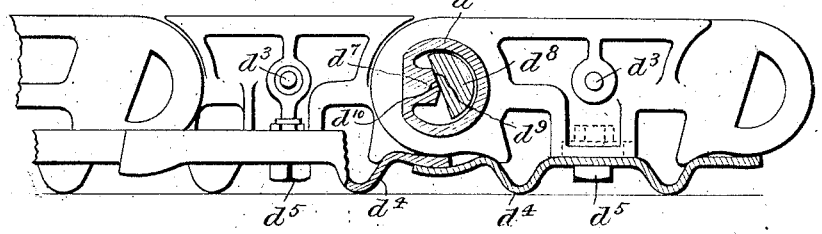
Inventor.
Clarence Leo Best,
By Bacon & Milans, Attorneys.

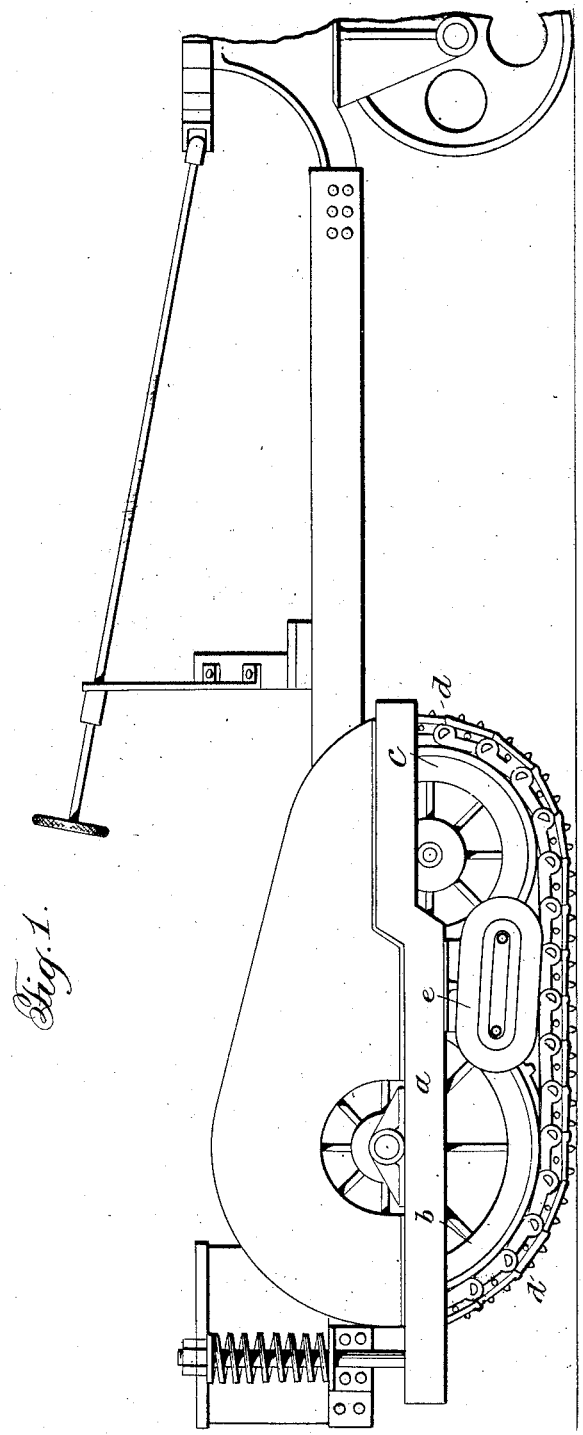

C. L. BEST.
TRACTOR CHAIN.
APPLICATION FILED FEB. 15, 1917.
1,356,958.
Patented Oct. 26, 1920.
3 SHEETS—SHEET 3.
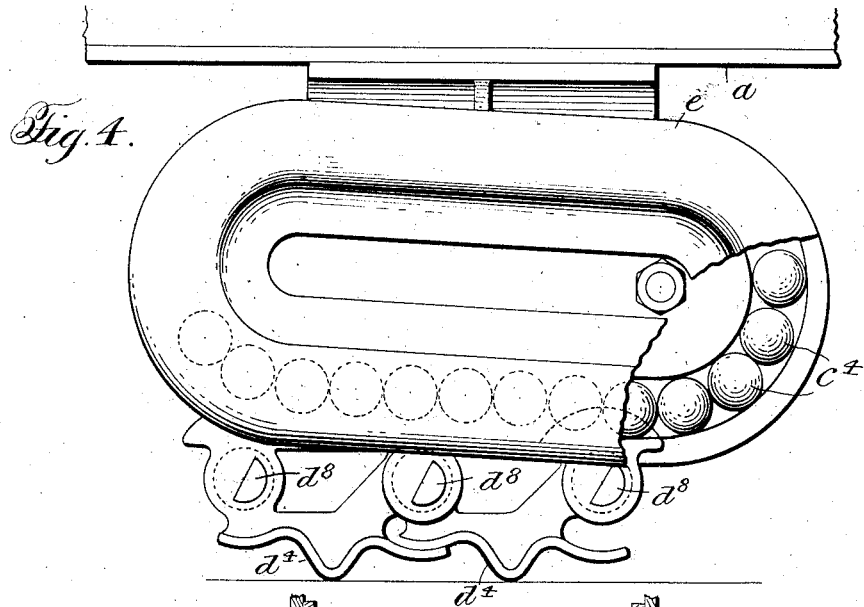
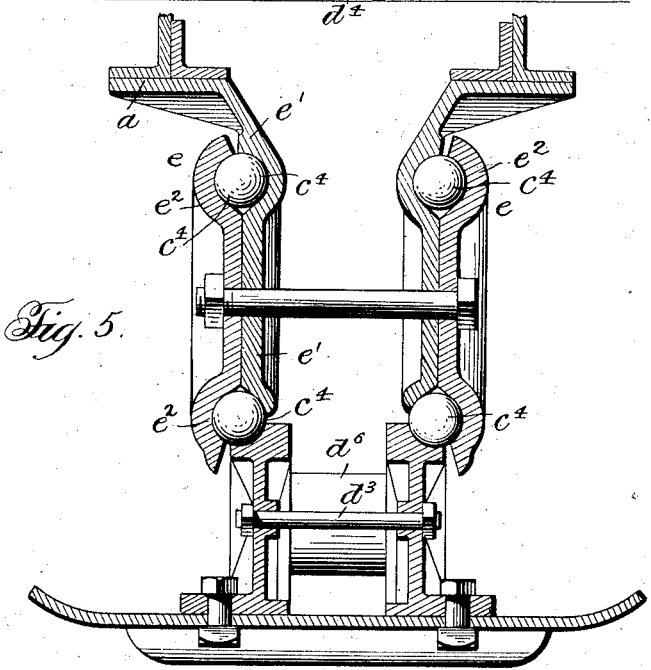

UNITED STATES PATENT OFFICE.

CLARENCE LEO BEST, OF OAKLAND, CALIFORNIA, ASSIGNOR TO THE HOLT MANUFACTURING COMPANY, OF STOCKTON, CALIFORNIA, A CORPORATION OF CALIFORNIA.

TRACTOR-CHAIN.

1,356,958.      Specification of Letters Patent.     Patented Oct. 26, 1920.

Original application filed April 6, 1914, Serial No. 829,848. Divided and this application filed February 15, 1917. Serial No. 148,776.

*To all whom it may concern:*

Be it known that I, CLARENCE LEO BEST, citizen of the United States, residing at Oakland, in the county of Alameda and State of California, have invented certain new and useful Improvements in Tractor-Chains, of which the following is a specification, reference being had therein to the accompanying drawing.

The present invention relates to improvements in tractor chains.

The object of the invention is to provide an improved tractor chain for self propelled tractor engines in which excessive friction and wear on the hinge pins will be greatly reduced, and that will be very durable and efficient in use.

An important object of the invention also is to provide an improved track laying tractor chain comprising connecting means for the chain link members constructed and arranged to provide a line contact rocking bearing between portions of the connecting means when the chain is flexed, and a relatively broad surface contact bearing between portions of the connecting means when the links extend in longitudinal alinement in the active or traction fold of the chain.

Another object of the invention is to provide an improved track laying tractor chain of the character referred to of simple construction that can be cheaply manufactured.

The invention, with other objects and advantages thereof, and the particular construction, combination and arrangement of parts comprising the same will be understood from the following detailed description when considered with the accompanying drawings forming part hereof and illustrating one embodiment of the invention.

In the drawings,

Figure 1 is a side elevation of part of a tractor engine equipped with an improved tractor chain constructed in accordance with the present invention;

Fig. 2 is a top plan view, on an enlarged scale, of a portion of the traction fold of the chain shown in Fig. 1 with parts shown in section;

Fig. 3 is a side elevation of the construction illustrated in Fig. 2, with parts shown in section;

Fig. 4 is a detail side elevation, on an enlarged scale, of the chain guide.

Fig. 5 is a transverse section of the construction illustrated in Fig. 4.

Fig. 6 is a detail perspective view of one of the bearing members of the chain, and Fig. 7 is a detail perspective view, of another of the bearing members of the chain.

I have illustrated in the drawings a preferred embodiment of the invention, the construction shown being fully set forth and described in my application, Serial No. 829,848, filed April 6, 1914, the present application being a division of said former case. In the drawing, $a$ designates a tractor truck frame having at one end a driving and supporting sprocket wheel $b$, and at its other end an idler wheel $c$. Extending around and engaging the sprocket wheel $b$ and idler wheel $c$ is the endless traction chain $d$.

The chain $d$ is made up of link members each comprising side plates $d'$ $d^2$ connected by bolt $d^3$ and also by tread plates $d^4$ with their holding bolts $d^5$. Between the side plates $d'$ $d^2$ is provided at one end a fulcrum case $d^6$ rigidly secured at each of its ends to the side members by any suitable means. Interiorly of the fulcrum case $d^6$ is provided a longitudinally extending radially projecting rib or fulcrum $d^7$ extending to the axis of the case $d^6$. The inner surface of the rib or fulcrum $d^7$ is beveled radially from the plane of its longitudinal center on opposite sides of its central plane thus forming the outer end of this fulcrum into an obtuse angle, the apex of which is the axis of the case $d^6$. Between the side plates $d'$ $d^2$ at the opposite end of the case $d^6$ is provided a strut $d^8$ of less diameter than the interior diameter of the case $d^6$ and having a flat working surface $d^9$ forming a plane extending longitudinally of the strut $d^8$ along its axis to rock or see-saw on the outer end of the fulcrum $d^7$. This strut $d^8$ is rigidly secured at each of its ends to the side members $d'$ $d^2$ with its working plane $d^9$ set at an angle with the longitudinal horizontal plane of the hinge axis of the said members. This angle corresponds to one of the angular surfaces $d^{10}$ of the fulcrum $d^7$ of the case $d^6$ to lie flat against the same, as indicated in Fig. 3 of the drawings, when the links of the chain extend in longitudinal alinement in the active or traction fold of the chain, and to rock or oscillate upon the outer end or apex of the fulcrum $d^7$ when the chain is flexed. The case of the side members $d'$ $d^2$ have an inward offset and the strut end of the said members have a corresponding offset, so that the links consisting of the two side members $d'$ $d^2$ may be assembled into a parallel sided continuous chain hinged together by each strut $d^8$ passing through its coacting fulcrum case.

The tread plates $d^4$ of the links and chain thus described extend somewhat beyond the hinged axis of the links of adjacent treads being suitably conformed to each other to overlap.

It will be observed that the particular tractor chain construction hereinbefore described provides for a line contact rocking bearing between portions of the link connecting means when the links are flexed so that all of the advantages of the line contact bearing, such as greater flexibility with less friction and wear, and avoidance or need of lubrication, etc., are obtained, at the same time when the links extend in longitudinal alinement in active position in the traction fold of the chain, a relatively broad flat bearing between portions of the connecting means is provided which serves to give increased support to and to afford a firmer and more effective traction tread.

It will also be noted that the connecting means for the link members of the chain is very simple in construction and can be cheaply manufactured.

Intermediate of the driving and supporting sprocket wheel $b$ and idler wheel $c$ is an anti-friction chain guide $e$ rigidly secured to the truck frame $a$, the guide being positioned between the truck frame and the lower or traction fold of the chain.

The anti-friction chain guide is shown as comprising oppositely disposed members or plates $e'$, each of which has associated therewith a plate $e^2$. The plates $e'$ and $e^2$ are complementarily formed to provide ball races $c^5$ for anti-friction balls $c^4$, the plates $e^2$ being held in position against the plates $e'$ by transverse fastening members $e^4$. As will be understood the balls $c^4$ of the races are adapted to engage the chain at opposite sides thereof serving as lateral and vertical abutments and guides as illustrated in Fig. 5 of the drawings.

I desire it to be understood that variations and minor changes in the particular construction illustrated in the drawings, as will appeal to those skilled in the art, may be made without departing from the broad principles of the invention.

Having thus described the invention, what I claim is:

A self-laying track for vehicles, comprising articulated link sections, each section being made up of parallel side plates, having their inner longitudinal edges formed with rails to support a truck mechanism and carrying at their outer longitudinal edges a tread plate, a gudgeon block connecting the side plates together at one end and forming a pin tooth for engagement with a sprocket wheel, the opposite ends of said side plates being formed to receive between them the end of an adjacent link section carrying a gudgeon block, and a pin passing through the side plates and through the interior of the gudgeon block for connecting adjacent links together, each gudgeon block being formed on its interior with a longitudinal rib beveled to leave a narrow ridge at the middle and sloping flat sides above and below the rib, and the pin being formed with a flat face on its side toward the rib and otherwise curved to rock freely within the gudgeon block whereby when the link sections are in a straight line the flat sloping side of the rib seats against the pin and when the link sections are angularly disposed as in passing around the sprocket wheel, the ridge of the rib only contacts with the pin.

In testimony whereof I hereunto affix my signature in the presence of two witnesses.

CLARENCE LEO BEST.

Witnesses:
    E. H. WHEELER,
    H. C. MONTGOMERY.